US007209970B1

(12) United States Patent
Everson et al.

(10) Patent No.: US 7,209,970 B1
(45) Date of Patent: Apr. 24, 2007

(54) AUTHENTICATION, APPLICATION-AUTHORIZATION, AND USER PROFILING USING DYNAMIC DIRECTORY SERVICES

(75) Inventors: John Everson, Kansas City, MO (US); James W. Norris, Kansas City, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 918 days.

(21) Appl. No.: 09/664,893

(22) Filed: Sep. 19, 2000

(51) Int. Cl.
*G06F 15/16* (2006.01)
(52) U.S. Cl. ............ 709/229; 709/227; 709/228; 703/4
(58) Field of Classification Search ............ 713/200, 713/201, 202; 705/18; 709/227
See application file for complete search history.

(56) References Cited

U.S. PATENT DOCUMENTS

| 5,455,953 | A | * | 10/1995 | Russell ............... 710/266 |
| 5,689,638 | A | * | 11/1997 | Sadovsky ............ 713/202 |
| 5,710,887 | A | * | 1/1998 | Chelliah et al. ....... 705/26 |
| 5,768,503 | A | * | 6/1998 | Olkin ................. 713/201 |
| 5,881,225 | A | * | 3/1999 | Worth ................ 713/200 |
| 5,884,312 | A | * | 3/1999 | Dustan et al. ........ 707/10 |
| 5,923,756 | A | * | 7/1999 | Shambroom ......... 713/156 |
| 5,960,411 | A | * | 9/1999 | Hartman et al. ...... 705/26 |
| 6,088,451 | A | * | 7/2000 | He et al. ............ 713/201 |
| 6,144,959 | A | * | 11/2000 | Anderson et al. ..... 707/9 |
| 6,199,113 | B1 | * | 3/2001 | Alegre et al. ........ 709/229 |
| 6,243,816 | B1 | * | 6/2001 | Fang et al. .......... 713/202 |
| 6,301,661 | B1 | * | 10/2001 | Shambroom ......... 713/168 |
| 6,360,249 | B1 | * | 3/2002 | Courts et al. ........ 709/203 |
| 6,480,894 | B1 | * | 11/2002 | Courts et al. ........ 709/227 |
| 6,539,482 | B1 | * | 3/2003 | Blanco et al. ....... 713/201 |
| 6,598,057 | B1 | * | 7/2003 | Synnestvedt et al. .. 707/200 |
| 6,654,891 | B1 | * | 11/2003 | Borsato et al. ...... 713/201 |

\* cited by examiner

*Primary Examiner*—Nasser Moazzami
*Assistant Examiner*—Pramila Parthasarathy

(57) ABSTRACT

A system and method for authenticating and authorizing computer users with a single, standard, directory-based set of applications. The invention combines dynamic directory services (DDS) with a directory access protocol such as the light weight directory access protocol (LDAP) to provide authentication and application-authorization for secured networks, applications, and programs. Dynamic information such as session information or user ID numbers is stored in a directory each time a user logs into the systems and is maintained in the directory until the user logs out. While the information exists in the directory, it can be queried by other programs, applications, or networks that use a directory service to authenticate or authorize the user for the program, application, or network.

28 Claims, 1 Drawing Sheet

Figure 1:
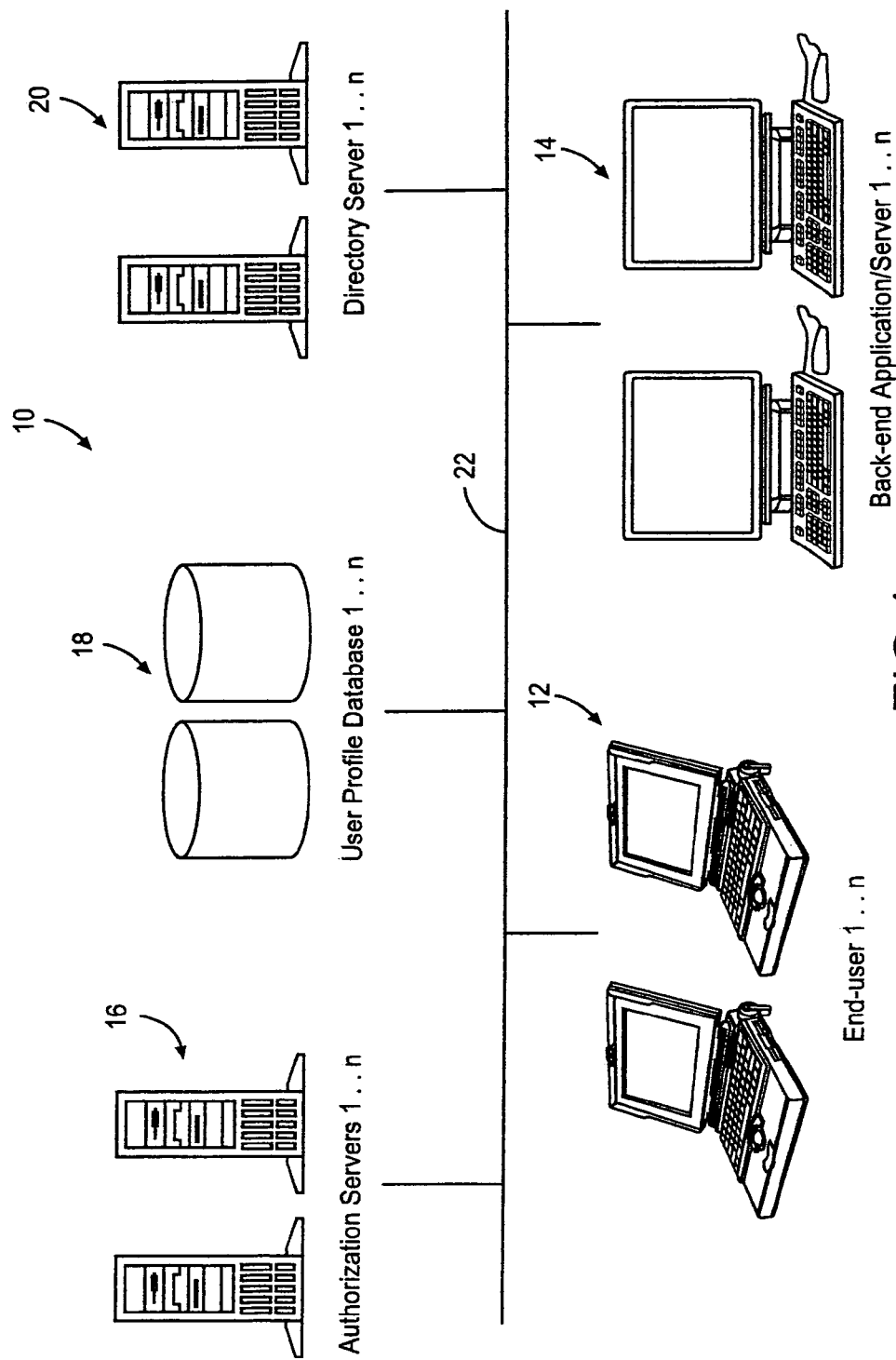

AUTHENTICATION, APPLICATION-AUTHORIZATION, AND USER PROFILING USING DYNAMIC DIRECTORY SERVICES

BACKGROUND OF THE INVENTION

1. Field of the Invention

The present invention relates to the fields of computer authentication, application authorization and user profiling. More particularly, the invention relates to the use of dynamic directory services (DDS) to dynamically store information in a directory server that can be used for authentication, application authorization, and user profiling purposes to eliminate the need for numerous authorization and access control schemes with a single standard directory based set of applications.

2. Description of the Prior Art

Many computer networks require users to be authenticated before they are allowed access thereto. Similarly, many computer applications and/or programs can only be accessed or used by authorized users. Computer users are typically authenticated and/or authorized by access control and security programs that contain or consult user profiles or databases (data repositories) containing access control information for the users. These access control and security programs typically require the entry of user IDs, passwords, etc., before users are allowed access to the networks and/or programs and applications.

Most networks, programs, and applications that have secured entries have their own proprietary access control and security systems (front and back). This requires computer users who wish to gain access to more than one network, application, and/or program during a computer session to repeatedly re-enter their user IDs, passwords, etc., each time they attempt to transfer from one network to another or from one application or program to another. This also requires each network, application, and program to have and maintain its own separate access control information for all users.

SUMMARY OF THE INVENTION

The present invention solves the above-described problems and provides a distinct advance in the art of computer authentication and authorization. More particularly, the present invention provides a system and method for authenticating and authorizing computer users with a single, standard, directory-based set of applications.

The present invention combines Dynamic Directory Services (DDS) with a directory access protocol such as the Lightweight Directory Access Protocol (LDAP) to provide authentication and authorization for secured networks, applications, and programs. The present invention uses DDS to store dynamic information such as session information or user ID information in a directory each time a user logs into the system and then maintains the information in the directory until the user logs out. While the information exists in the directory, it can be queried by any other program, application, or network that uses LDAP or other directory protocol to authenticate or authorize the user for the network or application. The present invention therefore eliminates the need to maintain separate access control systems for each secured network, program, or application.

The method and system of the present invention may also be used to provide a more convenient on-line shopping cart and for user profiling and session profiling purposes.

These and other important aspects of the present invention are described more fully in the detailed description below.

BRIEF DESCRIPTION OF THE DRAWING FIGURES

A preferred embodiment of the present invention is described in detail below with reference to the attached drawing figure, wherein:

FIG. 1 is a schematic diagram of computer and communications equipment that may be used to implement certain aspects of a preferred embodiment of the present invention.

The drawing figure does not limit the present invention to the specific embodiments disclosed and described herein. The drawing Figure is not necessarily to scale, emphasis instead being placed upon clearly illustrating the principles of the invention.

DETAILED DESCRIPTION OF THE PREFERRED EMBODIMENTS

The present invention combines a directory access protocol such as the Lightweight Directory Access Protocol (LDAP) or X.500 with Dynamic Directory Services (DDS) to provide authentication and application-authorization for secured networks, applications, and programs. Instead of using a directory for static information such as user names, addresses, and phone numbers, however, the present invention uses a directory to store dynamic information such as session information or a shopping cart. When a user logs into the system of the present invention, a user object is created in a directory and remains in the directory until the user logs out of the system. Then, any other applications and/or networks accessed by the computer user during the session may simply query the directory to obtain authorization and authentication information. A simple query to the directory can also indicate how many users are logged into the system at any given moment.

The present invention can be implemented in hardware, software, firmware, or a combination thereof. However, the invention is preferably implemented in software that operates computer and communication equipment such as the equipment identified by the numeral 10 in FIG. 1. The computer and communications equipment broadly includes a plurality of user computers 12, one or more application servers 14, one or more authorization servers 16, one or more user profile databases 18, a directory 20, and a communications network 22. The computer equipment and software illustrated and described herein are merely examples of hardware and software that may be used to implement a preferred embodiment of the present invention and may be replaced with other computer equipment and software without departing from the scope of the present invention.

The user computers 12 are entirely conventional and may be, for example, personal computers or even internet appliances. The user computers are each preferably equipped with a web browser and an internet connection such as a modem, an ISDN or DSL converter, or a cable modem so that they can access web sites on the Internet in a conventional manner.

The application servers 14 are coupled with the user computers 12 via the communications network 22 and are provided for running applications on behalf of the user computers. The application servers may be any computing devices such as network or server computers. The application servers may be used to handle all application operations between the browser-based computers 12 and a company's back end business applications or databases. Because many databases cannot interpret commands written in HTML, the application servers may serve as translators, allowing computer users to search for information with a browser.

The authorization servers 16 are coupled with the user computers 12 and the application servers 14 via the communications network 22 and are provided for authenticating and authorizing the user computers. The authorization servers may be any computing devices such as network or server computers running Windows NT, Novell Netware, Unix, or any other network operating system. As described in more detail below, the authorization servers may use any means for authenticating and authorizing users such as tokens, certificates, IDs, passwords, and access control measures.

The user profile databases 18 are coupled with the authorization servers 16 via the communications network 22 and are operable for storing certain profile information relating to the users of the user computers 12. The user profile databases may store, for example, user IDs, passwords, access control information such as what applications each computer user is allowed to access, shipping addresses, credit card numbers, information about previous purchases, and any other information useful for authentication, application authorization and user profiling and session profiling/management issues.

The directory 20 is coupled with the authorization servers 16 and the user profile databases 18 via the communications network 22 and is provided for storing directory information used in the present invention as described in more detail below. The directory may reside on any conventional computing device such as one or more network computers or server computers.

The communications network 22 may be a local area network, a wide area network, an intranet, an extranet, the Internet, or any other conventional network or combination of networks. In preferred forms, the user computers 12 may access the authorization servers 16 via the Internet, and the other components of the system 10 communicate via a local or wide area network.

The present invention is fully scalable in that any number of the above described devices of the system 10 can be added as needed. Moreover, none of the devices need to be from a particular vendor, or run on a particular platform. For example, there may be five different authorization servers 16 that perform authentication and authorization of users, but each server may use a different method to authenticate users.

Operation of the computer and communications equipment 10 is controlled by one or more computer programs. Each computer program preferably comprises an ordered listing of executable instructions for implementing logical functions in the authorization servers 16 and the other computing devices as described herein. The computer programs can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. In the context of this application, a "computer-readable medium" can be any means that can contain, store, communicate, propagate or transport the program for use by or in connection with the instruction execution system, apparatus, or device. The computer-readable medium can be, for example, but not limited to, an electronic, magnetic, optical, electro-magnetic, infrared, or semi-conductor system, apparatus, device, or propagation medium. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM). The computer-readable medium could even be paper or another suitable medium upon which the program is printed, as the program can be electronically captured, via for instance, optical scanning of the paper or other medium, then compiled, interpreted, or otherwise processed in a suitable manner, if necessary, and then stored in a computer memory.

The following is a description of the operation of a preferred implementation of the present invention. In some alternative implementations, the functions described below in a particular order may occur out of the order described. For example, two steps described separately may in fact be executed substantially concurrently, or may sometimes be executed in the reverse order depending upon the functionality involved.

A user first launches some application or program in a conventional manner with one of the user computers 12. The particular application or program that is launched is not important to the present invention and may include, for example, an internet browser, a Java application, a Java applet, a visual basic application, or any other program or application.

The application is initially directed to one of the authorization servers 16. Which authorization server that is accessed may be based on any criteria including, but not limited to, the first authorization server that answers, a round-robin selection process, geographical criteria, or requirements based on the software or application being used.

The user next logs into the selected authorization server 16 using account or ID information that was established during a user-enrollment/setup process that occurred sometime in the past. The type of account information and authentication or authorization may be specific to the type of applications or network that the user has access to or the role that the user has been assigned.

In accordance with one important aspect of the present invention, the authorization server 16 creates a Session ID for the user after log-in. The Session ID may relate to the date or time that the user logged in, the media access control address of the user's computer 12, the TCP/IP address of the user's computer, the user's name, an account code for the user, a combination of any of these criteria, or any other criteria. It is important only that the Session ID be unique to the user and the particular authorization server 16 that was accessed.

The authorization server 16 then copies or links the Session ID or some derivative thereof to something on the user's computer 12 such as a cookie, shared application memory, or the computer's network address. It is important only that other applications launched by the user from the user computer be able to read or otherwise determine this Session ID by accessing something on the user's computer.

The authorization server 16 also creates an object representing the user or the Session ID and stores it in the directory 20 after log-in. The object name is preferably the same as the Session ID but may be any name relating to the Session ID. After the object is created and stored in the directory, the authorization server copies or parses information about the user from the user profile database 18 and writes this information to the new directory object. The type of information depends on who the user is, what applications the user is allowed to use, what the role of the user is, and how the user was authenticated. The information could even include user IDs and passwords for other applications to provide single log-in or sign-on capabilities. The information may also be encrypted, signed, or otherwise protected for security purposes.

After the user has successfully logged in, the menu or interface of the application the user attempted to launch is loaded so that the user may use the launched application. This function may be performed by the authorization server 16, one of the application servers 14, or any other piece of computer equipment.

The above steps provide a means to authenticate and/or authorize the user for other applications and/or networks. Specifically, when the user attempts to access other applications and/or networks while he or she is still logged into the system, these other applications may reference the Session ID on the user's computer. Using the Session ID, the other applications may read the user information that has been copied to the user's object in the directory for authentication and authorization purposes related to the new applications. The new applications may also be able to modify the information in the object so that the object could pass information to other applications such as in a shopping cart environment described below.

The present invention may be used to replace numerous authorization and access control schemes with one standard, directory-based set of applications. The present invention allows all applications, computer programs, and networks that use a directory access protocol such as LDAP to access all user profile and access control information created for a user while the user is logged into the system. This eliminates the need to create and maintain numerous authorization and access control schemes and requires a user to be authorized only once during a computer session.

The following is a more detailed example of how the above process may be implemented. Assume that the system 10 includes five authorization servers 16 and that a user logs into authorization server number 2 (AS2) with a browser. AS2 first creates a unique, random Session ID for the user such as 82012053249. The authorization server then creates a cookie named "SID" in the user's browser and assigns it a value of AS2.82012053249.

The authorization server 16 also creates an object in the directory 20 and relates it to the Session ID. The object is then populated with information from the user's profile, such as the user's ID, password, e-mail address, account number, etc.

The user is then offered a menu of applications/services that he or she is authorized to use or access. The user may select one of the applications or services, for example a "View Bill" application. The View Bill application accesses the cookie named "SID" on the user's computer 12 and reads the value AS2.82012053249 from the cookie. The application then searches the directory 20 for the object associated with the cookie under the branch of the directory containing information for authorization server AS2. The application reads the associated attributes (i.e. the account number, user ID, password) from the directory to determine what information the user is authorized to access. The View Bill application may then collect authorized information such as billing information from one of the application servers 14 and present it to the user on the screen of the user's computer.

When the user logs off, the object for the user stored in the directory 20 is deleted. The object may be deleted immediately after log-off or after a certain amount of time has elapsed. If the user attempts to log-in after the object has been deleted, the above process may be repeated for the same or even a different authorization server.

Another possible application of the present invention is for on-line shopping carts. Assume, for example, that a user has already logged into the system 10 and that an object for the user has been created in the directory 20. Associated with the user's object is a shopping cart. The user browses shopping selections available via one or more merchandise servers and can add things to and or remove things from the shopping cart. If the user selects a book, for example, and indicates that he or she wants to purchase the book, the ISBN number of the book is added to the user's object in the directory. As the user purchases more items, these items are also added to the user's object in the directory.

When the user is ready to purchase the items, a check-out server queries the object in the directory 20 and obtains information for all of the items selected by the user. The check-out server may be a different server located in a different part of the network or may be connected with the other components in the network. The user information in the object may also contain credit card information so that purchases can be expedited. When the user logs out of the system 10, the user's object in the directory is preferably deleted to make room for objects for other users.

The present invention may also be used to determine how many users are logged into the system 10 at any given moment. Because a user object is created and maintained in the directory 20 whenever a user is logged into the system, a simple query to the directory can indicate how many users are currently logged into the system. For example, the number of objects created under the AS2 branch of the directory indicates how many sessions were established by that particular authorization server. This information can be used to determine which authorization servers are over or under utilized.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. A method for dynamically tracking a user session in order to authenticate and authorize a computer user to a plurality of separately secured remote applications, the method comprising the steps of:
   a. storing security information for a plurality of computer users in a user profile database;
   b. the user launching a first secured computer application on an application server;
   c. receiving login information from the computer user at an authorization server coupled with the user profile database;
   d. in response to step c, creating a Session ID for the computer user with the authorization server;
   e. storing at least a portion of the Session ID on the user's computer;
   f. also in response to step c, creating an object associated with the computer user or the Session ID;
   g. storing the object dynamically in a directory stored in a directory server coupled with the authorization server and the application server;
   h. copying at least some of the security information relating to the computer user from the user profile database to the object in the directory;

i. comparing the log-in information entered by the computer user to the security information for the computer user and allowing the computer user access to the first secured computer application if the user is an authenticated or authorized user of the first secured computer application;
j. the user launching a second separately-secured computer application on an application server;
k. the second separately-secured computer application reading the Session ID on the user's computer; and
l. the second separately-secured computer applications accessing the object for the computer user on the directory server in response to the Session ID to authenticate or authorize the user for the second separately-secured computer application.

2. The method as set forth in claim 1, the security information including authentication and authorization information.

3. The method as set forth in claim 2, the authentication and authorization information including at least one of the following: user names, user IDs, passwords, public-key data, certificates, and access control information.

4. The method as set forth in claim 1, the Session ID being based on at least one of the following: a date on which the computer user launched the first secured computer application; a time in which the computer user launched the first secured computer application; a TCP/IP address of the computer user; and a user name of the computer user.

5. The method as set forth in claim 1, further including the steps of creating a shopping cart and storing the shopping cart along with the object in the directory.

6. The method as set forth in claim 5, further including the steps of allowing the user to select items to be purchased and storing information relating to the selected items in the shopping cart.

7. A system for dynamically tracking a user session in order to authenticate and authorize a computer user to a plurality of separately secured remote applications, the system comprising:
a user profile database for storing security information for a plurality of computer users;
an authorization server coupled with the user profile database for receiving log-in information from a computer user who has launched a first secured computer application, for creating a Session ID for the computer user, for storing at least a portion of the Session ID on the user's computer and for creating an object associated with the computer user or the Session ID; and
a directory stored in a directory server coupled with the authorization server for dynamically storing the object created by the authorization server,
the authorization server being further operable for copying at least some of the security information relating to the computer user from the user profile database to the object in the directory, comparing log-in information entered by the computer user to the security information for the computer user and allowing the computer user access to the launched first secured computer application if the user is an authenticated or authorized user of the computer application,
the directory server permitting other separately-secured computer applications launched by the computer user to reference the Session ID read by the separately-secured computer applications on the user's computer so that the other separately-secured computer applications may access the object for the computer user on the directory server to authenticate or authorize the user for the other separately-secured computer applications.

8. The system as set forth in claim 7, the security information including authentication and authorization information.

9. The system as set forth in claim 8, the authentication and authorization information including at least one of the following: user names, user IDs, passwords, public-key data, certificates, and access control information.

10. The system as set forth in claim 7, the Session ID being based on at least one of the following: a date on which the computer user launched the first secured computer application; a time in which the computer user launched the first secured computer application; a TCP/IP address of the computer user; and a user name of the computer user.

11. The system as set forth in claim 7, the directory server being further operable for creating a shopping cart and storing the shopping cart along with the object in the directory.

12. The system as set forth in claim 11, the directory server being further operable for allowing the user to select items to be purchased and storing information relating to the selected items in the shopping cart.

13. The method as set forth in claim 1, wherein the other computer applications access the object on the directory server using a dynamic directory service.

14. The method as set forth in claim 13, wherein the dynamic directory service comprises the lightweight directory access protocol (LDAP).

15. The method as set forth in claim 13, wherein the dynamic directory service comprises the X.500 access protocol.

16. The system as set forth in claim 7, wherein the other computer applications access the object on the directory server using a dynamic directory service.

17. The system as set forth in claim 16, wherein the dynamic directory service comprises the lightweight directory access protocol (LDAP).

18. The system as set forth in claim 16, wherein the dynamic directory service comprises the X.500 access protocol.

19. A method of authenticating and authorizing a user to a plurality of separately-secured computer applications, the method comprising the steps of:
the user remotely launching a first secured computer application from a user computer;
authenticating and authorizing the user to the first secured computer application by exchanging security information between the user and an authorization server;
storing at least a portion of the security information in an object within a dynamic directory on a directory server;
storing a link to the object on the user computer;
the user remotely launching a second separately-secured computer application on an application server;
retrieving the link; and
authenticating and authorizing the user to the second separately-secured computer application by exchanging the stored security information between the directory server and the application server.

20. The method of claim 19 wherein the exchanging of security information between the directory server and the application server employs a dynamic directory service.

21. The method of claim 19 wherein the security information includes a Session ID that is stored in the object and in the link.

22. The method of claim 19 further comprising the steps of:

one of the secured computer applications storing application data in the object; and the other one of the secured computer applications retrieving the application data according to the link.

23. The method of claim 22 wherein the one of the secured computer applications is a shopping application, wherein the stored application data is comprised of shopping cart information; and wherein the other one of the secured computer applications is a check-out application.

24. A system for authenticating and authorizing a user remotely launching secured computer applications from a user computer, the system comprising:

an authorization server for authenticating and authorizing the user to the secured computer applications by exchanging security information between the user and the authorization server when a first secured computer application is launched by the user;

a directory server storing at least a portion of the security information in an object within a dynamic directory, wherein a link to the object is stored on the user computer; and an application server implementing a second separately-secured computer application for remote launching by the user, wherein the second separately-secured computer application retrieves the link, and wherein the user is authenticated and authorized to the second separately-secured computer application by exchanging the stored security information between the directory server and the application server.

25. The system of claim 24 wherein the exchanging of security information between the directory server and the application server employs a dynamic directory service.

26. The system of claim 24 wherein the security information includes a Session ID that is stored in the object and in the link.

27. The system of claim 24 wherein one of the secured computer applications stores application data in the object, and wherein the other one of the secured computer applications retrieves the application data according to the link.

28. The system of claim 27 wherein the one of the secured computer applications is a shopping application, wherein the stored application data is comprised of shopping cart information; and wherein the other one of the secured computer applications is a check-out application.

* * * * *